(12) United States Patent
Imazeki et al.

(10) Patent No.: US 12,181,756 B2
(45) Date of Patent: Dec. 31, 2024

(54) LIGHT ADJUSTMENT DEVICE HAVING A PANEL UNIT INCLUDING LIGHT ADJUSTMENT PANELS

(71) Applicant: Japan Display Inc., Tokyo (JP)

(72) Inventors: Yoshikatsu Imazeki, Tokyo (JP); Yoshifumi Kamei, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/206,788

(22) Filed: Jun. 7, 2023

(65) Prior Publication Data
US 2023/0400738 A1 Dec. 14, 2023

(30) Foreign Application Priority Data

Jun. 14, 2022 (JP) ................................ 2022-095844

(51) Int. Cl.
| | |
|---|---|
| *G02F 1/1345* | (2006.01) |
| *G02F 1/1333* | (2006.01) |
| *G02F 1/1339* | (2006.01) |
| *G02F 1/1347* | (2006.01) |

(52) U.S. Cl.
CPC ...... *G02F 1/1345* (2013.01); *G02F 1/133342* (2021.01); *G02F 1/1339* (2013.01); *G02F 1/13471* (2013.01); *G02F 2203/48* (2013.01)

(58) Field of Classification Search
None
See application file for complete search history.

(56) References Cited

U.S. PATENT DOCUMENTS

| | | | | |
|---|---|---|---|---|
| 5,416,622 | A | * | 5/1995 | Engfer .............. B32B 17/10761 313/511 |
| 2014/0118221 | A1 | * | 5/2014 | Park ........................ G09G 3/20 345/1.3 |

FOREIGN PATENT DOCUMENTS

| | | | | |
|---|---|---|---|---|
| CN | 11-1983863 | * | 11/2020 | ............. G02F 1/137 |
| JP | 2004333567 | A | 11/2004 | |

* cited by examiner

*Primary Examiner* — Lauren Nguyen
(74) *Attorney, Agent, or Firm* — K&L Gates LLP

(57) ABSTRACT

A light adjustment device includes a panel unit formed in a shape of a rectangular column by stacking a plurality of light adjustment panels in a first direction, each of the light adjustment panels having a polygonal shape and including a first substrate and a second substrate, the first substrate including a first terminal, the second substrate overlapping the first substrate and including a second terminal, and a conductive member provided at a corner of the rectangular column in a side part of the panel unit and continuously extending in the first direction.

5 Claims, 14 Drawing Sheets

|  | TERMINAL | | | |
|---|---|---|---|---|
|  | FIRST SUBSTRATE | | SECOND SUBSTRATE | |
| PANEL 1A | 220 (510) | 240 (530) | 310 (520) | 330 (540) |
| PANEL 2A | 220 (510) | 240 (530) | 310 (520) | 330 (540) |
| PANEL 3A | 220 (540) | 240 (520) | 310 (510) | 330 (530) |
| PANEL 4A | 220 (540) | 240 (520) | 310 (510) | 330 (530) |

LIGHT ADJUSTMENT DEVICE HAVING A PANEL UNIT INCLUDING LIGHT ADJUSTMENT PANELS

CROSS-REFERENCE TO RELATED APPLICATION

This application claims the benefit of priority from Japanese Patent Application No. 2022-095844 filed on Jun. 14, 2022, the entire contents of which are incorporated herein by reference.

BACKGROUND

1. Technical Field

The present disclosure relates to a light adjustment device.

2. Description of the Related Art

A light adjustment device of Japanese Patent Application Laid-open Publication No. 2004-333567 includes a panel unit in which a plurality of light adjustment panels are stacked. Each light adjustment panel includes, for example, a first substrate, a second substrate, and a liquid crystal layer encapsulated between these substrates. When incident light enters from one side in the stacking direction of the panel unit, the optical transmittance of the incident light is adjusted and the adjusted light is output as transmitting light from the other side in the stacking direction of the panel unit. In each light adjustment panel, the first substrate and the second substrate are vertically stacked. Each of the first substrate and the second substrate is provided with a terminal. Specifically, the first substrate is larger than the second substrate such that part of the first substrate is exposed from the second substrate when viewed in the stacking direction of the light adjustment panels, and the terminal is provided at the exposed part. For example, flexible printed circuits (FPC) are electrically coupled to the terminal.

Recently, size reduction of a light adjustment device has been desired.

The present disclosure is made in view of the above-described problem and intended to provide a light adjustment device having a reduced size when viewed in the stacking direction of light adjustment panels.

SUMMARY

A light adjustment device according to an embodiment of the present disclosure includes a panel unit formed in a shape of a rectangular column by stacking a plurality of light adjustment panels in a first direction, each of the light adjustment panels having a polygonal shape and including a first substrate and a second substrate, the first substrate including a first terminal, the second substrate overlapping the first substrate and including a second terminal, and a conductive member provided at a corner of the rectangular column in a side part of the panel unit and continuously extending in the first direction. Each of the first substrate and the second substrate includes a first side, a second side adjacent to the first side, and an intersection part at which the first side intersects the second side, the first terminal includes a first site extending along the first side of the first substrate, a second site extending along the second side of the first substrate, and a first corner through which the first site couples to the second site at the intersection part of the first substrate, the first corner corresponding to the corner of the panel unit, the second terminal includes a third site extending along the first side of the second substrate, a fourth site extending along the second side of the second substrate, and a second corner through which the third site couples to the fourth site at the intersection part of the second substrate, the second corner corresponding to the corner of the panel unit, and the conductive member electrically couples the first corner of the first terminal and the second corner of the second terminal in each of the light adjustment panels.

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below can be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

First Embodiment

Figure 1:
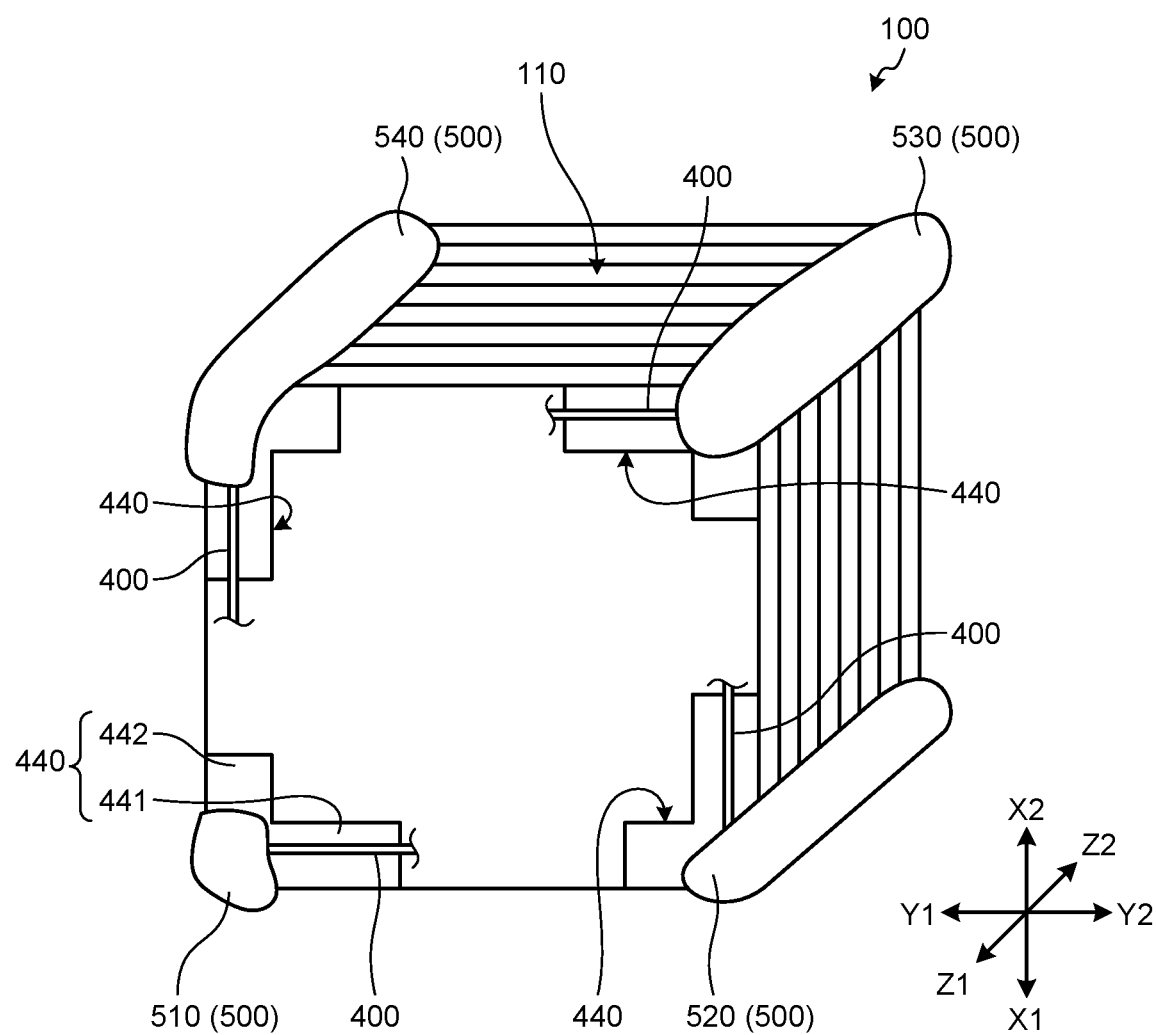
FIG. 1 is a perspective view schematically illustrating a light adjustment device according to a first embodiment.
Figure 2:
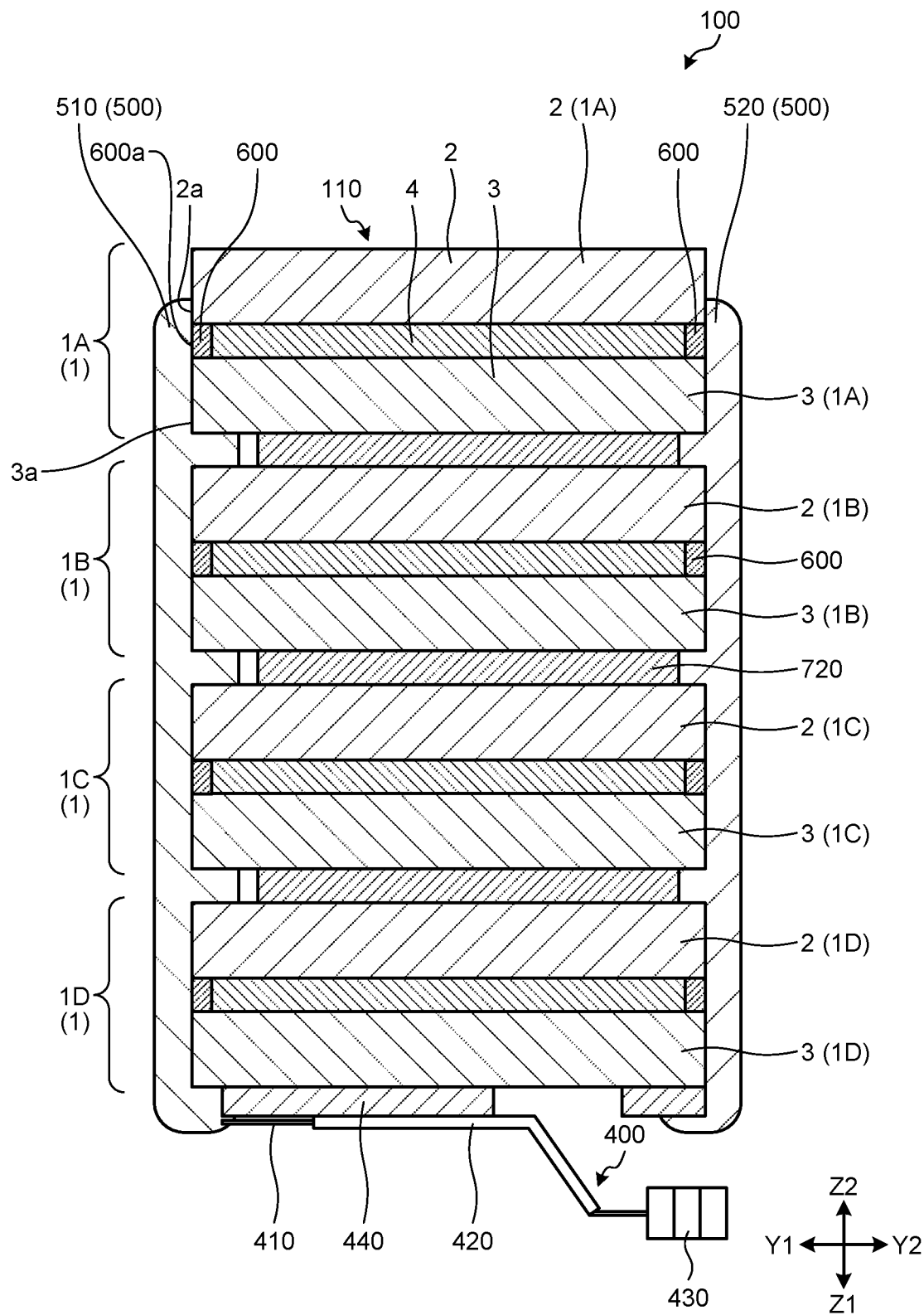
FIG. 2 is a sectional view of the light adjustment device in FIG. 1.
Figure 3:
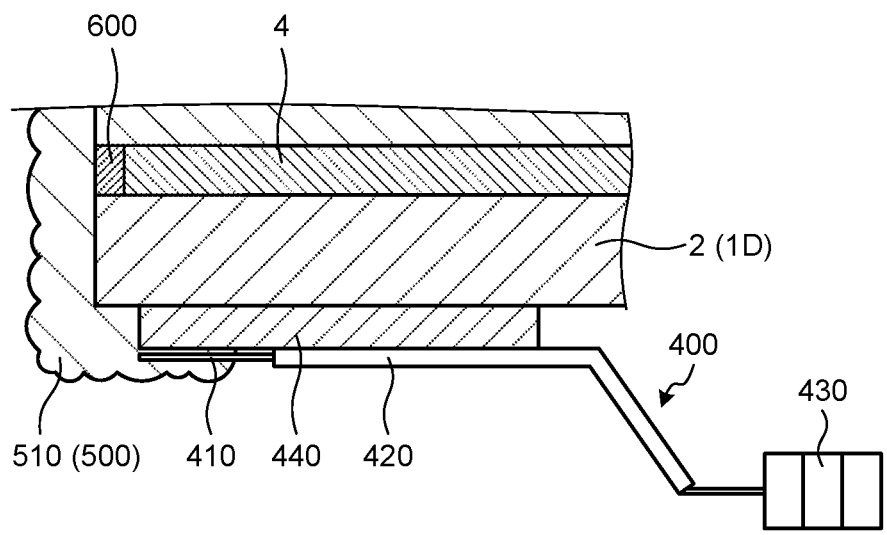
FIG. 3 is a schematic diagram illustrating an external coupling wire coupled to a conductive member.
Figure 4:
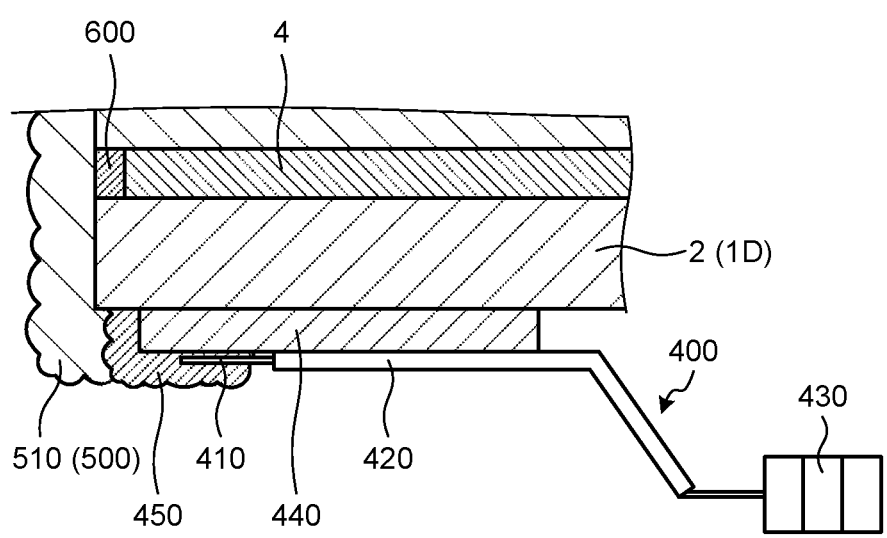
FIG. 4 is a schematic diagram illustrating a modification of the external coupling wire coupled to the conductive member.

FIG. 1 is a perspective view schematically illustrating a light adjustment device according to a first embodiment. FIG. 2 is a sectional view of the light adjustment device in FIG. 1. FIG. 3 is a schematic diagram illustrating an external coupling wire coupled to a conductive member. FIG. 4 is a schematic diagram illustrating a modification of the external coupling wire coupled to the conductive member.

In an XYZ coordinate system illustrated in the drawings, an X direction is the front-back direction, and an X1 side is opposite an X2 side. The X1 side is also referred to as a front side, and the X2 side is also referred to as a back side. A Y direction is the right-left direction, and a Y1 side is opposite a Y2 side. The Y1 side is also referred to as a left side, and the Y2 side is also referred to as a right side. A Z direction is the up-down direction (stacking direction). A Z1 side is opposite a Z2 side. The Z1 side is also referred to as a lower side, and the Z2 side is also referred to as an upper side. The Z direction is also referred to as a first direction, and for example, one side in the first direction is the Z1 side in the Z direction, and the other side in the first direction is the Z2 side in the Z direction.

As illustrated in FIGS. 1 and 2, a light adjustment device 100 according to the first embodiment includes a panel unit 110, a conductive member 500, and an external coupling wire 400. For the external coupling wire 400, for example, a conductive wire is applicable, and flexible printed circuits (FPC) may also be applicable.

In the present embodiment, the panel unit 110 is formed in a shape of a rectangular column by stacking a plurality (four in the embodiment) of light adjustment panels 1 in the Z direction (first direction). The panel unit 110 is, for example, a square column but may be a polygonal column such as an octagonal column. Each light adjustment panel 1 has a square shape in the present embodiment, but the present invention is not limited thereto and includes a polygonal shape such as an octagonal shape to be described later.

Specifically, as illustrated in FIG. 2, the four light adjustment panels 1 are light adjustment panels 1A, 1B, 1C, and 1D stacked in order from the Z2 side. Each light adjustment panel 1 includes a first substrate 2 disposed on the Z2 side, a second substrate 3 disposed on the Z1 side of the first substrate 2, a sealing material 600 provided between the first substrate 2 and the second substrate 3, and a liquid crystal layer 4 filled on the inner side of the sealing material 600. The inside of the sealing material 600 is an effective region. The first substrate 2 and the second substrate 3 have substantially identical sizes when viewed in the Z direction. As illustrated in FIG. 2, each two light adjustment panels 1 adjacent to each other in the Z direction are joined to each other with a translucent bonding agent 720 (for example, optical clear adhesive (OCA) or optical clear resin (OCR)).

As illustrated in FIG. 1, four conductive members 500 extend in the up-down direction at the four corners of the panel unit 110. Specifically, the conductive members 500 are conductive members 510, 520, 530, and 540. The conductive member 510 is provided at the corner of the panel unit 110 on the X1 side and the Y1 side when the panel unit 110 is viewed in the Z direction. The conductive member 520 is provided at the corner of the panel unit 110 on the X1 side and the Y2 side when the panel unit 110 is viewed in the Z direction. The conductive member 530 is provided at the corner of the panel unit 110 on the X2 side and the Y2 side when the panel unit 110 is viewed in the Z direction. The conductive member 540 is provided at the corner of the panel unit 110 on the X2 side and the Y1 side when the panel unit 110 is viewed in the Z direction. For the material of the conductive members 500, for example, silver (Ag) or carbon (C) is applicable. The conductive members 500 are formed by, for example, applying paste containing a conductive material to the first substrate 2 or the like and curing the paste.

As illustrated in FIG. 1, for example, four external coupling electrodes 440 are provided on a surface of the first substrate 2 on the Z1 side in the light adjustment panel 1D positioned closest to the Z1 side. The external coupling electrodes 440 are provided at the four corners of the panel unit 110. Each external coupling electrode 440 has an L shape and includes a longer-side part 441 and a shorter-side part 442. The longer-side part 441 and the shorter-side part 442 extend along sides of the light adjustment panel 1D. The external coupling wire 400 extends in the direction of the longer-side part 441. One external coupling wire 400 is provided to each external coupling electrode 440. Thus, in the present embodiment, four external coupling wires 400 are provided. As illustrated in FIG. 3, each external coupling electrode 440 is coupled to an end part of the corresponding conductive member 500. Each external coupling wire 400 includes an electrical line 410 and a cover material 420 covering the electrical line 410. One end of the electrical line 410 is coupled to the end part of the conductive member 500, and the other end of the electrical line 410 is coupled to a light source 430. The light source 430 emits light in accordance with electric power supply. For the light source 430, for example, a light emitting diode (LED) is applicable, and, for example, a filament lamp or the like may also be applicable.

As illustrated in FIG. 4, a conductor 450 may be coupled to the end part of the conductive member 500, and the one end of the electrical line 410 may be coupled to the conductor 450. In other words, the external coupling wire 400 may be electrically coupled to the conductive member 500 through the conductor 450.

Figure 5:
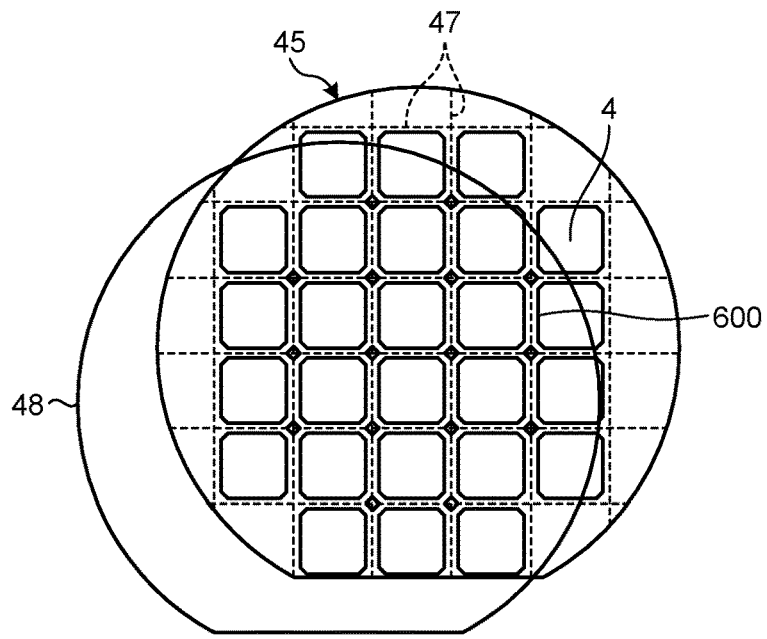
FIG. 5 is a schematic diagram illustrating a wafer on which a plurality of cells are provided.
Figure 6:
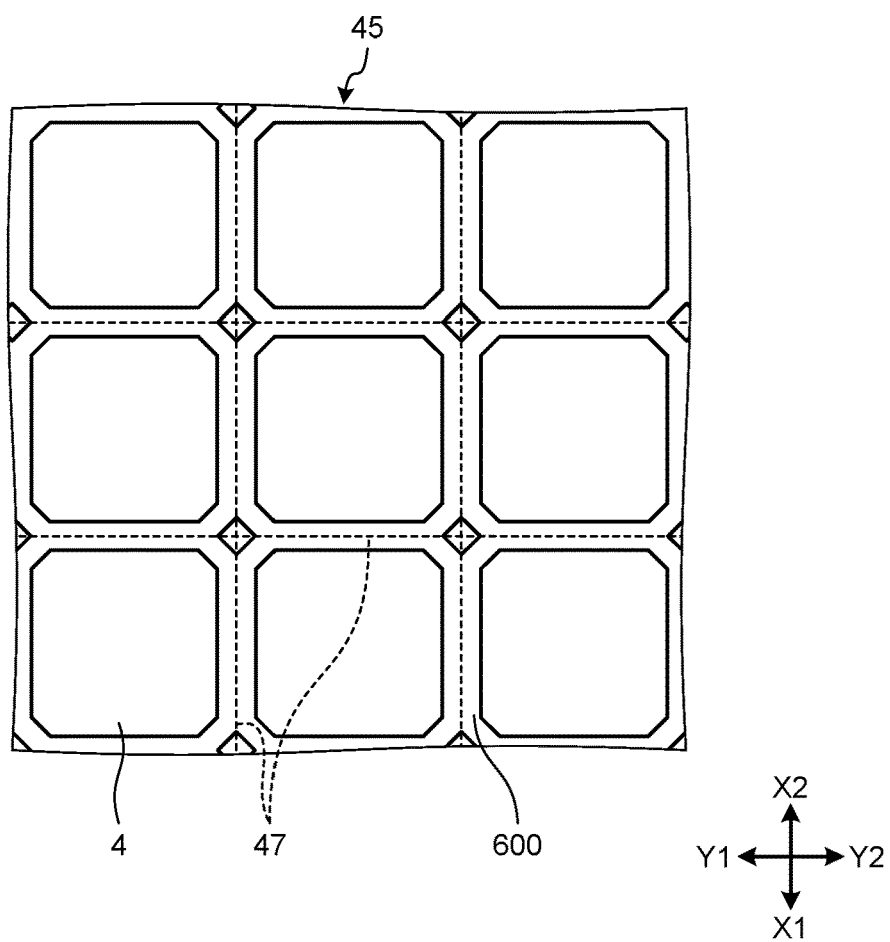
FIG. 6 is an enlarged plan view illustrating part of FIG. 5.
Figure 7:
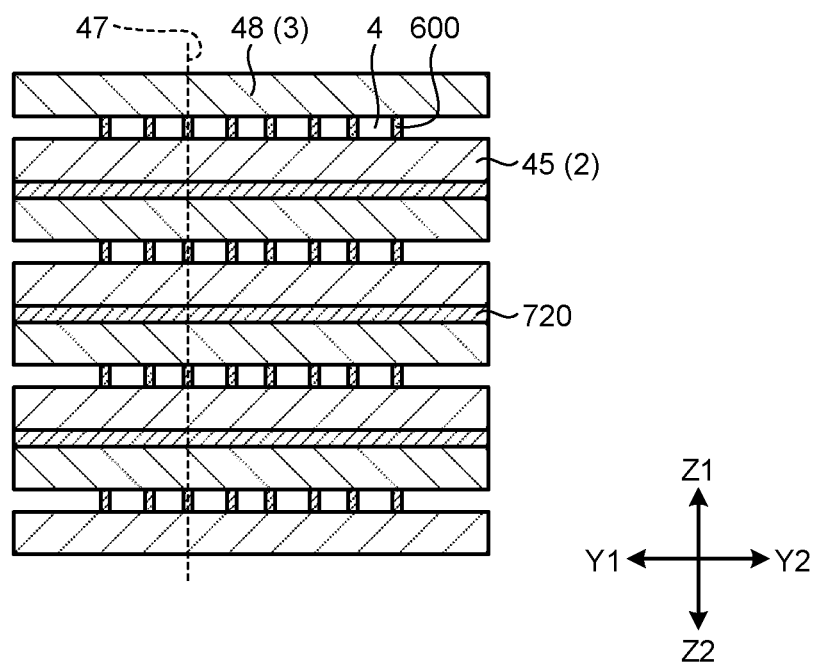
FIG. 7 is a sectional view illustrating a stack of a plurality of layers of the cells in FIG. 5.

The following briefly describes a procedure of producing the panel unit 110 by vertically cutting and dicing stacked wafers. FIG. 5 is a schematic diagram illustrating a wafer on which a plurality of cells are provided. FIG. 6 is an enlarged plan view illustrating part of FIG. 5. FIG. 7 is a sectional view illustrating a stack of a plurality of layers of the cells in FIG. 5.

As illustrated in FIGS. 5 and 6, the sealing materials 600 and the liquid crystal layers 4 are disposed at constant intervals on a wafer 45 to be the first substrates 2. Dashed lines illustrate division lines 47. Specifically, the sealing materials 600 are formed in a lattice shape in the X and Y directions, and then liquid crystal is filled on the inner side of the sealing materials 600 to form the liquid crystal layers 4. Another wafer 48 to be the second substrates 3 are placed and attached on the wafer 45, and then bonded and vertically stacked by using the translucent bonding agent 720 (for example, OCR) as illustrated in FIG. 7. The division lines 47 are set along the centers of the sealing materials 600 in the width direction as illustrated in FIG. 6. No sealing material 600 is disposed but a rectangular gap is formed at each intersection of a longitudinal division line 47 and a lateral division line 47 as illustrated in FIG. 6. Then, the wafers are cut and diced along the division lines 47, for example, with a wire saw or by dicing, and accordingly, the panel unit 110 is completed. Thus, as illustrated in FIG. 2, a first end face 2a, a second end face 3a, and a third end face 600a are flush with one another where the first end face 2a is an end face of each first substrate 2, the second end face 3a is the corresponding end face of the corresponding second substrate 3, and the third end face 600a is the corresponding end face of the corresponding sealing material 600.

Figure 8:
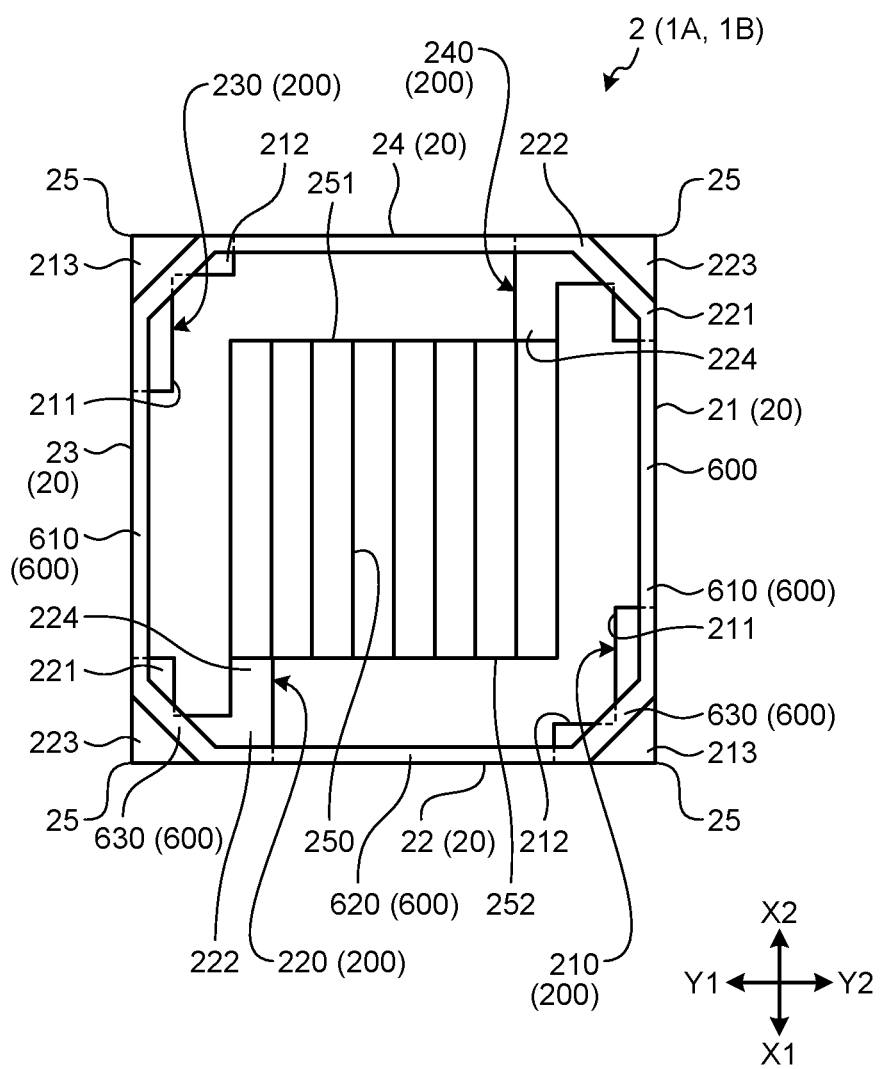
FIG. 8 is a plan view illustrating a first substrate in each of the first and second light adjustment panels from a Z2 side in a panel unit illustrated in FIG. 1.
Figure 9:
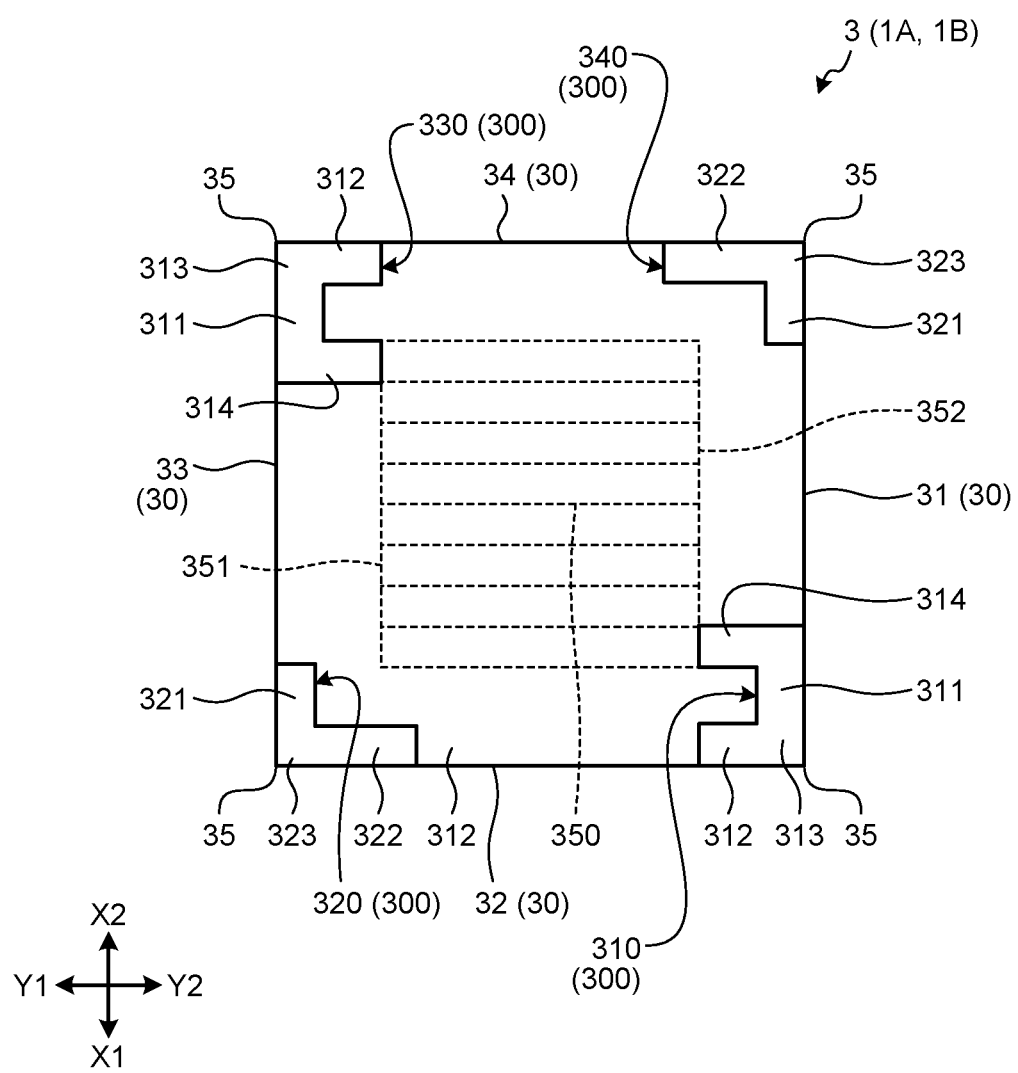
FIG. 9 is a plan view illustrating a second substrate in each of the first and second light adjustment panels from the Z2 side in the panel unit illustrated in FIG. 1.
Figure 10:
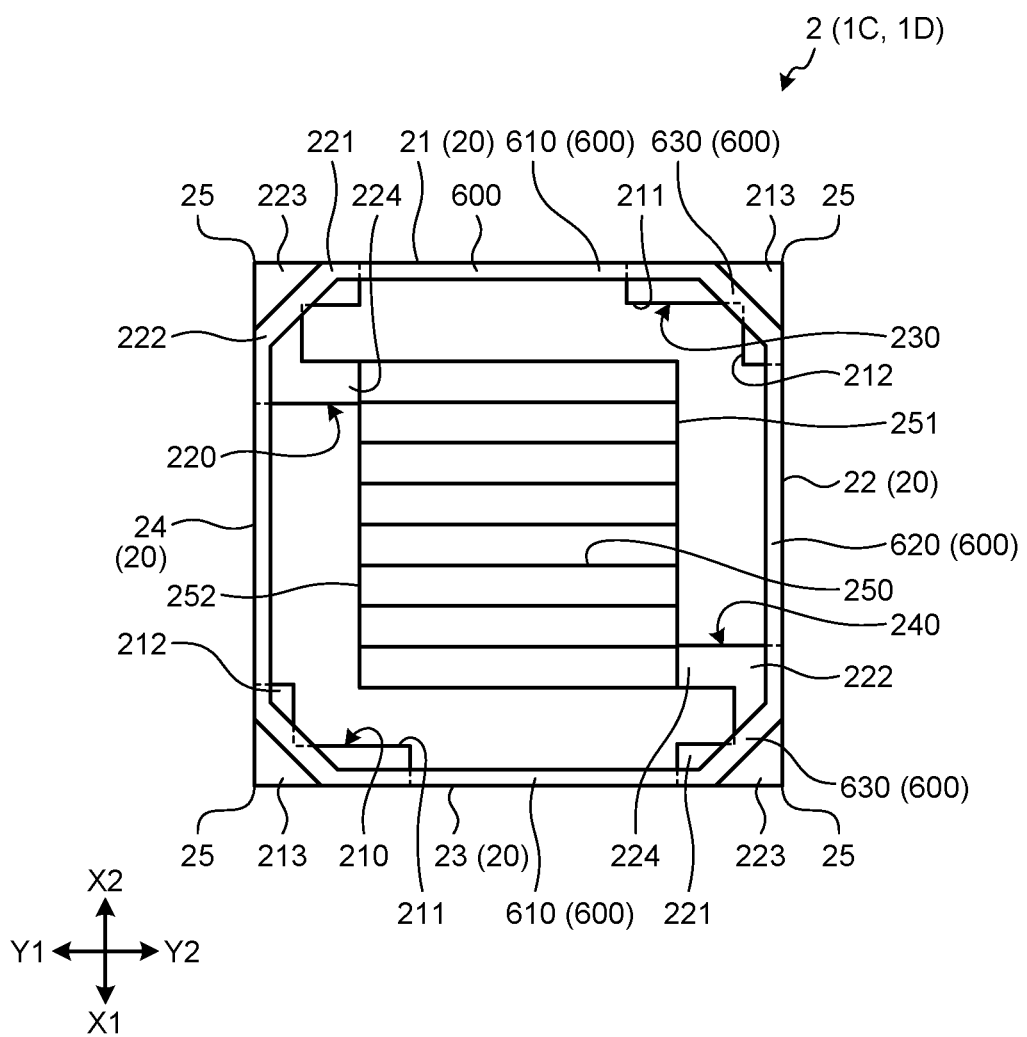
FIG. 10 is a plan view illustrating a first substrate in each of the third and fourth light adjustment panels from the Z2 side in the panel unit illustrated in FIG. 1.
Figure 11:
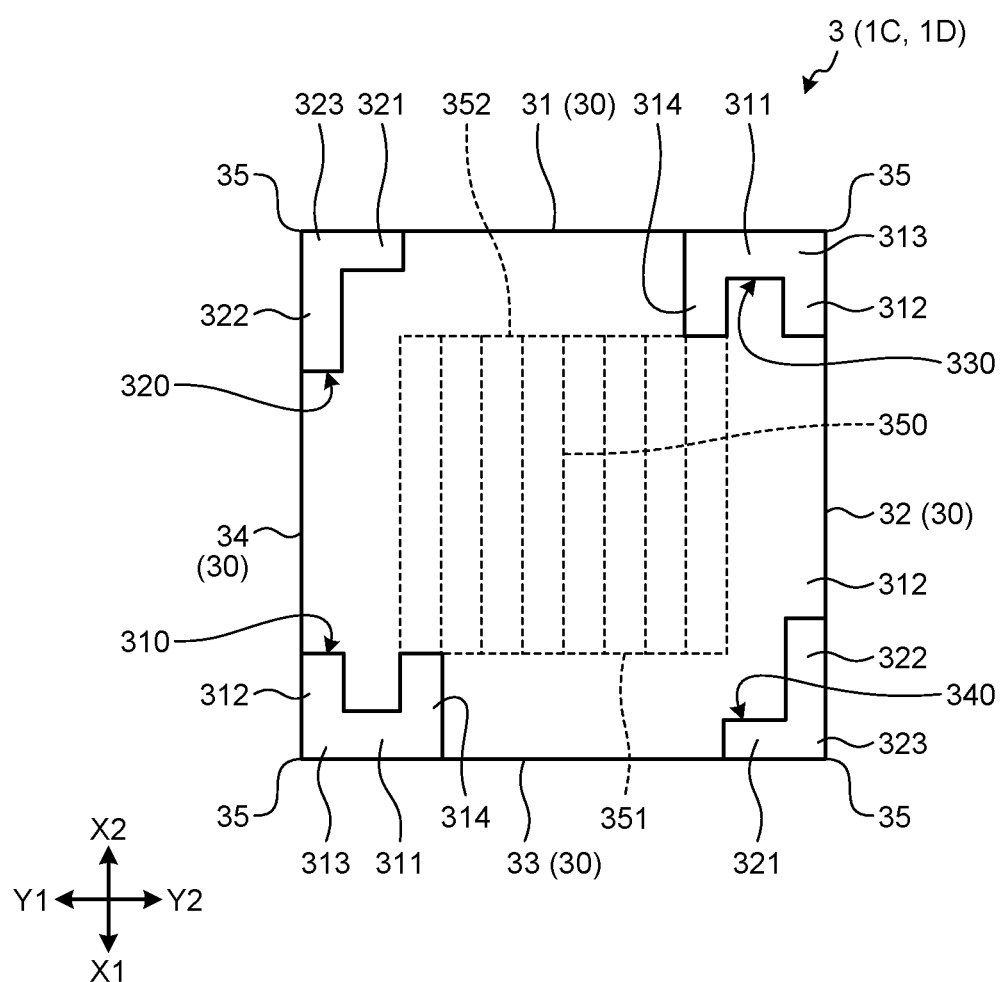
FIG. 11 is a plan view illustrating a second substrate in each of the third and fourth light adjustment panels from the Z2 side in the panel unit illustrated in FIG. 1.
Figures 12, 13:
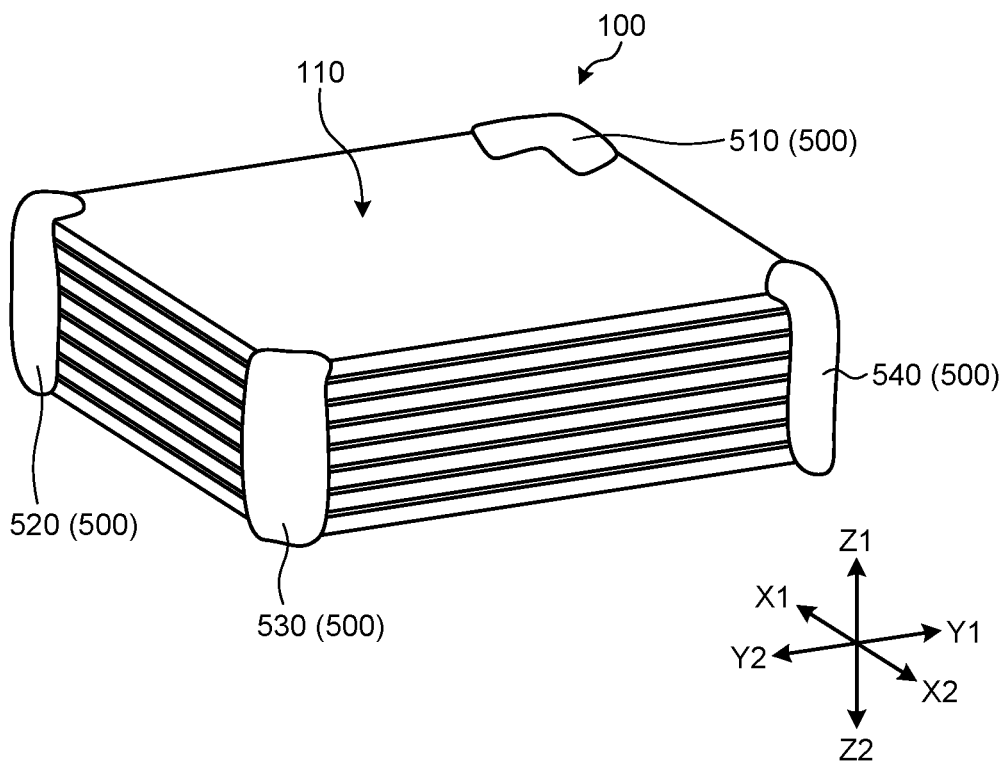
FIG. 12 is a perspective view schematically illustrating the light adjustment device according to the first embodiment in which four light adjustment panels are stacked.
FIG. 13 is a table listing the relation between each of four conductive members and conductive members coupled to electrodes of an array substrate and a counter substrate in each light adjustment panel.

The following describes wires and terminals of the first substrates 2 and the second substrates 3 included in the panel unit 110 in detail. FIG. 8 is a plan view illustrating the first substrate in each of the first and second light adjustment panels from the Z2 side in the panel unit illustrated in FIG. 1. FIG. 9 is a plan view illustrating the second substrate in each of the first and second light adjustment panels from the Z2 side in the panel unit illustrated in FIG. 1. FIG. 10 is a plan view illustrating the first substrate in each of the third and fourth light adjustment panels from the Z2 side in the panel unit illustrated in FIG. 1. FIG. 11 is a plan view illustrating the second substrate in each of the third and fourth light adjustment panels from the Z2 side in the panel unit illustrated in FIG. 1. FIG. 12 is a perspective view schematically illustrating the light adjustment device according to the first embodiment in which the four light adjustment panels are stacked. FIG. 13 is a table listing the relation between each of the four conductive members and conductive members coupled to electrodes of an array substrate and a counter substrate in each light adjustment panel.

As described above, according to FIG. 2, the four light adjustment panels are the light adjustment panel 1A, the light adjustment panel 1B, the light adjustment panel 1C, and the light adjustment panel 1D stacked in order from the Z2 side.

As illustrated in FIG. 8, the first substrate 2 of each of the light adjustment panels 1A and 1B includes a first terminal 200 and a liquid crystal drive electrode 250. The first terminal 200 includes first terminals 210, 220, 230, and 240. The first substrate 2 has a square shape in a plan view in the Z direction and has four sides Specifically, the sides 20 include sides 21, 22, 23, and 24. The side 21 is positioned on the Y2 side. The side 22 is positioned on the X1 side. The side 23 is positioned on the Y1 side. The side 24 is positioned on the X2 side. The side 21 is also referred to as a first side, the side 22 is also referred to as a second side, and the sides 21 and 22 intersect each other at an intersection part 25.

The first terminal 210 includes a first site 211, a second site 212, and a first corner 213. The first terminal 210 has an L shape in a plan view in the present embodiment. The first site 211 and the second site 212 are wide strip bodies. The first site 211 extends along the side (first side) 21. The second site 212 extends along the side (second side) 22. The side (first side) 21 and the side (second side) 22 are adjacent to each other. The first site 211 and the second site 212 couple to each other at the first corner 213.

The first terminal 220 includes a first site 221, a second site 222, a first corner 223, and a protrusion 224. The first terminal 220 has a U shape in a plan view in the present embodiment. The first site 221 and the second site 222 are wide strip bodies. The first site 221 extends along the side (first side) 23. The second site 222 extends along the side (second side) 22. The side (first side) 23 and the side (second side) 22 are adjacent to each other. The first site 221 and the second site 222 couple to each other at the first corner 223. The first terminal 230 has the same shape as the first terminal 210, and the first terminal 240 has the same shape as the first terminal 220.

Each sealing material 600 includes a first peripheral part 610, a second peripheral part 620, and a coupling part 630. The first peripheral part 610 extends along, for example, the side (first side) 21. The second peripheral part 620 extends along, for example, the side (second side) 22. An end of the first peripheral part 610 and an end of the second peripheral part 620 are separated from the intersection part 25. Accordingly, the coupling part 630 that couples the end of the first peripheral part 610 and the end of the second peripheral part 620 obliquely intersects the first peripheral part 610 and second peripheral part 620. The angle of the intersection is, for example, 45°. In this manner, the coupling part 630 is disposed on the inner side of the intersection part 25 (central side of the first substrate 2). Accordingly, part of the first corner 213 is exposed from the coupling part 630 of the sealing material 600. The exposed part has a substantially triangular shape in a plan view. Similarly for the other three corners of the first substrate 2, part of each of the first corners 213 and 223 is exposed from the corresponding coupling part 630 of the sealing material 600, and the exposed part has a substantially triangular shape in a plan view.

As illustrated in FIG. 8, the liquid crystal drive electrode 250 is provided at the center of the first substrate 2. A plurality of liquid crystal drive electrodes 250 are provided and each extend in the X direction. An end of each liquid crystal drive electrode 250 on the X2 side is coupled to a wire 251. The wire 251 extends in the Y direction. An end of each liquid crystal drive electrode 250 on the X1 side is coupled to a wire 252. The wire 252 extends in the Y direction. The wire 251 is coupled to the first terminal 240. The wire 252 is coupled to the first terminal 220.

As illustrated in FIG. 9, the second substrate 3 of each of the light adjustment panels 1A and 1B includes a second terminal 300 and a liquid crystal drive electrode 350. The second terminal 300 includes second terminals 310, 320, 330, and 340. The second substrate 3 has a square shape in a plan view in the Z direction and has four sides 30. Specifically, the sides 30 include sides 31, 32, 33, and 34. The side 31 is positioned on the Y2 side. The side 32 is positioned on the X1 side. The side 33 is positioned on the Y1 side. The side 34 is positioned on the X2 side. The side 31 is also referred to as a first side, the side 32 is also referred to as a second side, and the sides 31 and 32 intersect each other at an intersection part 35.

The second terminal 310 includes a third site 311, a fourth site 312, a second corner 313, and a protrusion 314. The second terminal 310 has a U shape in a plan view in the present embodiment. The third site 311, the fourth site 312, and the protrusion 314 are wide strip bodies. The third site 311 extends along the side (first side) 31. The fourth site 312 extends along the side (second side) 32. The side (first side) 31 and the side (second side) 32 are adjacent to each other.

The third site 311 and the fourth site 312 couple to each other at the second corner 313. The protrusion 314 extends from the third site 311 in the Y1 side.

The second terminal 320 includes a third site 321, a fourth site 322, and a second corner 323. The second terminal 320 has an L shape in a plan view in the present embodiment. The third site 321 and the fourth site 322 are wide strip bodies. The third site 321 extends along the side (first side) 33. The fourth site 322 extends along the side (second side) 32. The side (first side) 33 and the side (second side) 32 are adjacent to each other. The third site 321 and the fourth site 322 couple to each other at the second corner 323. The second terminal 330 has the same shape as the second terminal 310, and the second terminal 340 has the same shape as the second terminal 320.

As illustrated in FIG. 9, the liquid crystal drive electrode 350 is provided at the center of the second substrate 3. A plurality of liquid crystal drive electrodes 350 are provided and each extend in the Y direction. An end of each liquid crystal drive electrode 350 on the Y1 side is coupled to a wire 351. The wire 351 extends in the X direction. An end of each liquid crystal drive electrode 350 on the Y2 side is coupled to a wire 352. The wire 352 extends in the X direction. The wire 351 is coupled to the second terminal 330. The wire 352 is coupled to the second terminal 320.

As illustrated in FIG. 10, the configuration of the first substrate 2 of each of the light adjustment panels 1C and 1D is obtained by rotating the configuration of the first substrate 2 of each of the light adjustment panels 1A and 1B illustrated in FIG. 8 by 90° in the clockwise direction (rightward direction). Specifically, the substrates are the same but disposed in orientations rotated from each other by 90° about the central parts of the substrates. Thus, for example, the side 21 of the first substrate 2 of each of the light adjustment panels 1A and 1B is positioned on the Y2 side, whereas the side 21 of the first substrate 2 of each of the light adjustment panels 1C and 1D is positioned on the X1 side.

As illustrated in FIG. 11, the configuration of the second substrate 3 of each of the light adjustment panels 1C and 1D is obtained by rotating the configuration of the second substrate 3 of each of the light adjustment panels 1A and 1B illustrated in FIG. 9 by 90° in the clockwise direction (rightward direction). Specifically, the substrates are the same but disposed in orientations rotated from each other by 90° about the central parts of the substrates. Thus, for example, the side 31 of the second substrate 3 of each of the light adjustment panels 1A and 1B is positioned on the Y2 side, whereas the side 31 of the second substrate 3 of each of the light adjustment panels 1C and 1D is positioned on the X1 side.

The above-described light adjustment panels 1A, 1B, 1C, and 1D are sequentially stacked in the Z direction to obtain the panel unit 110 illustrated in FIG. 12. Thereafter, the conductive members 500 are formed at the four corners of the panel unit 110. Specifically, the conductive members 500 are formed by applying paste containing a conductive material to the first substrate 2 or the like of each light adjustment panel 1 and curing the paste. In this manner, a conductive members 50 extend from the light adjustment panel 1D positioned closest to the Z1 side to the light adjustment panel 1A positioned closest to the Z2 side in the panel unit 110. The conductive members are coupled to the first corners 213 and 223 of the first terminals 200 and the second corners 313 and 323 of the second terminals 300 in each light adjustment panel 1.

The following describes the table in FIG. 13. For example, 220(510) written in a cell for the first substrate of the light adjustment panel 1A means that the first terminal 220 illustrated in FIG. 8 is coupled to the conductive member 510. As illustrated in FIG. 8, the first terminal 220 is positioned at the corner of the first substrate 2 on the X1 side and the Y1 side. As illustrated in FIG. 12, the conductive member 510 is positioned at the corner of the panel unit 110 on the X1 side and the Y1 side. Thus, the conductive member 510 and the first terminal 220 disposed at the same corner on the X1 side and the Y1 side are electrically coupled to each other.

In addition, 330(530) written in a cell for the second substrate of the light adjustment panel 1D means that the second terminal 330 illustrated in FIG. 11 is coupled to the conductive member 530. As illustrated in FIG. 11, the second terminal 330 is positioned at the corner of the second substrate 3 on the X2 side and the Y2 side. As illustrated in FIG. 12, the conductive member 530 is positioned at the corner of the panel unit 110 on the X2 side and the Y2 side. Thus, the conductive member 530 and the second terminal 330 disposed at the same corner on the X2 side and the Y2 side are electrically coupled to each other. In the light adjustment device 100, a liquid crystal cell for p-wave polarization and a liquid crystal cell for s-wave polarization are stacked and combined.

As described above, the light adjustment device 100 includes: the panel unit 110 formed by stacking a plurality of light adjustment panels 1 in the Z direction (first direction or stacking direction), each light adjustment panel 1 having a polygonal shape and including the first substrate 2 and the second substrate 3, the first substrate 2 including the first terminal 200, the second substrate 3 overlapping the first substrate 2 and including the second terminal 300; and the conductive member 500 provided at a corner in a side part of the panel unit 110 and continuously extending in the Z direction. The first substrate 2 has a polygonal shape including the side 21 (first side), the side 22 (second side) adjacent to the side 21 (first side), and the intersection part 25 at which the side 21 intersects the side 22. The second substrate 3 has a polygonal shape including the side 31 (first side), the side 32 (second side) adjacent to the side 31 (first side), and the intersection part 35 at which the side 31 intersects the side 32. The first terminal 200 includes the first site 211 or 221 extending along the first side of the first substrate 2, the second site 212 or 222 extending along the second side of the first substrate 2, and the first corner 213 or 223 through which the first site couples to the second site at the intersection part 25 or of the first substrate 2. The second terminal 300 includes the third site 311 or 321 extending along the first side of the second substrate 3, the fourth site 312 or 322 extending along the second side of the second substrate 3, and the second corner 313 or 323 through which the third site couples to the fourth site at the intersection part 25 or 35 of the second substrate 3. The conductive member 500 is coupled to the first corner 213 or 223 of the first terminal 200 and the second corner 313 or 323 of the second terminal 300 in each light adjustment panel 1.

As described above, in conventional cases, for example, the first substrate is larger than the second substrate such that part of the first substrate is exposed from the second substrate when viewed in the stacking direction (first direction) of the light adjustment panels, and a terminal is provided at the exposed part, and thus the size of the light adjustment device potentially increases.

However, in the present embodiment, the first terminal 200 and the second terminal 300 in each light adjustment panel 1 are disposed at a corner in a side part of the panel unit 110, and the conductive member 500 extending in the Z direction electrically couples the first terminal 200 and the second terminal 300 in each light adjustment panel 1. Thus, the first substrate 2 can be set to the same size as the second substrate 3, and accordingly, it is possible to provide the light adjustment device 100 having a reduced size when viewed in the Z direction.

The sealing material 600 that seals the liquid crystal layer 4 is provided between the first substrate 2 and the second substrate 3 in each light adjustment panel 1. The sealing material 600 is disposed on the inner side of the intersection parts 25 and 35. At least part of each of the first corner 213 or 223 of the first terminal 200 and the second corner 313 or 323 of the second terminal 300 is exposed from the sealing material 600.

When the sealing material 600 is provided between a plurality of adjacently arranged chips, it is possible to produce the panel unit 110 by cutting the sealing material 600 for dicing, for example, with a wire saw or by dicing. In this case, cutting powder is generated due to the cutting and thus needs to be washed away by spraying cleaning liquid.

Since at least part of each of the first corner 213 or 223 of the first terminal 200 and the second corner 313 or 323 of the second terminal 300 is exposed from the sealing material 600, the surface of the exposed terminal is washed away by cleaning liquid.

The sealing material 600 includes the first peripheral part 610 extending along each of the first side 21 of the first substrate 2 and the first side 31 of the second substrate 3, the second peripheral part 620 extending along each of the second side 22 of the first substrate 2 and the second side 32 of the second substrate 3, and the coupling part 630 that couples the end of the first peripheral part 610 and the end of the second peripheral part 620. The coupling part 630 is disposed on the inner side of the intersection part 25 or 35, and at least part of each of the first corner 213 or 223 of the first terminal 200 and the second corner 313 or 323 of the second terminal 300 is exposed from the sealing material 600.

Since the coupling part 630 is disposed on the inner side of the intersection part 25 or 35, the corners of the first and second substrates 2 and 3 are exposed from the sealing material 600. Thus, the surfaces of the exposed terminals are washed away by cleaning liquid.

The first end face 2a that is an end face of the first substrate 2, the second end face 3a that is an end face of the second substrate 3, and the third end face 600a that is an end face of the sealing material 600 are flush with one another.

The sealing material 600 is preferably disposed at a site closer to a peripheral part of a substrate because the area of the effective region increases. When an end face of the first substrate 2, an end face of the second substrate 3, and an end face of the sealing material 600 are disposed at positions different from one another in the X or Y direction, the outer edge of the light adjustment panel 1 expands outward and the light adjustment device 100 has a larger size when viewed in the Z direction.

Thus, with the configuration in which the first end face 2a, the second end face 3a, and the third end face 600a are flush with one another, it is possible to increase the area of the effective region and reduce the size of the entire light adjustment device 100 when viewed in the Z direction.

Since each external coupling wire 400 is a conductive wire and the conductive wire is electrically coupled to the conductive member 500, it is possible to easily couple the external coupling wire 400 to the conductive member 500. Moreover, it is possible to reduce the size of the light adjustment device 100 by electrically coupling one end of the external coupling wire 400 to a site closest to the Z2 side or closest to the Z1 side (the other side in the first direction) on the conductive member 500 and by coupling the other end of the external coupling wire 400 to the light source 430.

The external coupling wire 400 is a conductive wire, and the conductive wire is electrically coupled to the conductive member 500 through the conductor 450. Thus, even when it is difficult to couple the external coupling wire 400 to the conductive member 500 because of the material of the conductive member 500, it is possible to couple the external coupling wire 400 to the conductive member 500 through the conductor 450 by changing the material of the conductor 450 as appropriate.

Second Embodiment

Figure 14:
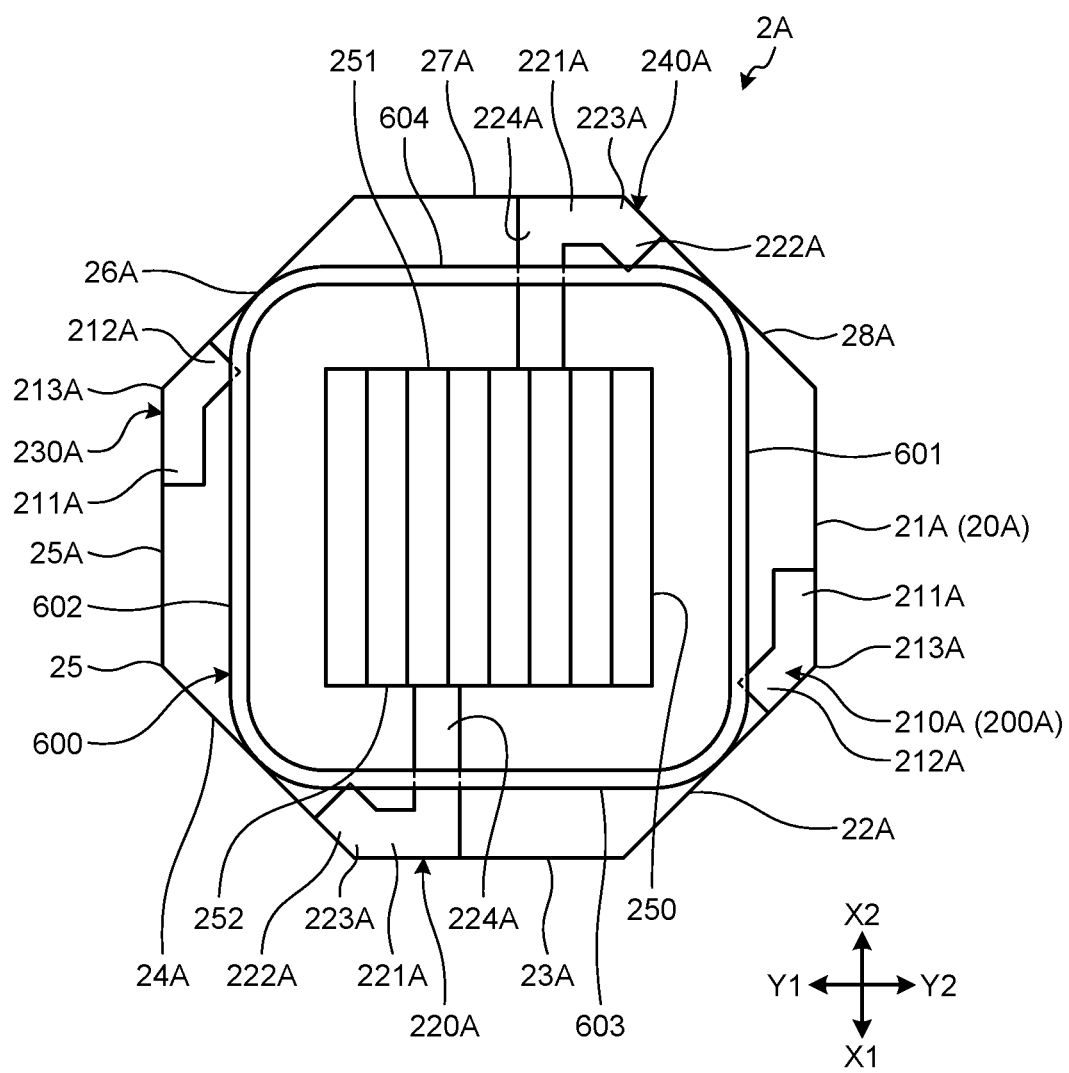
FIG. 14 is a plan view schematically illustrating a first substrate and a sealing material in a light adjustment device according to a second embodiment.
Figure 15:
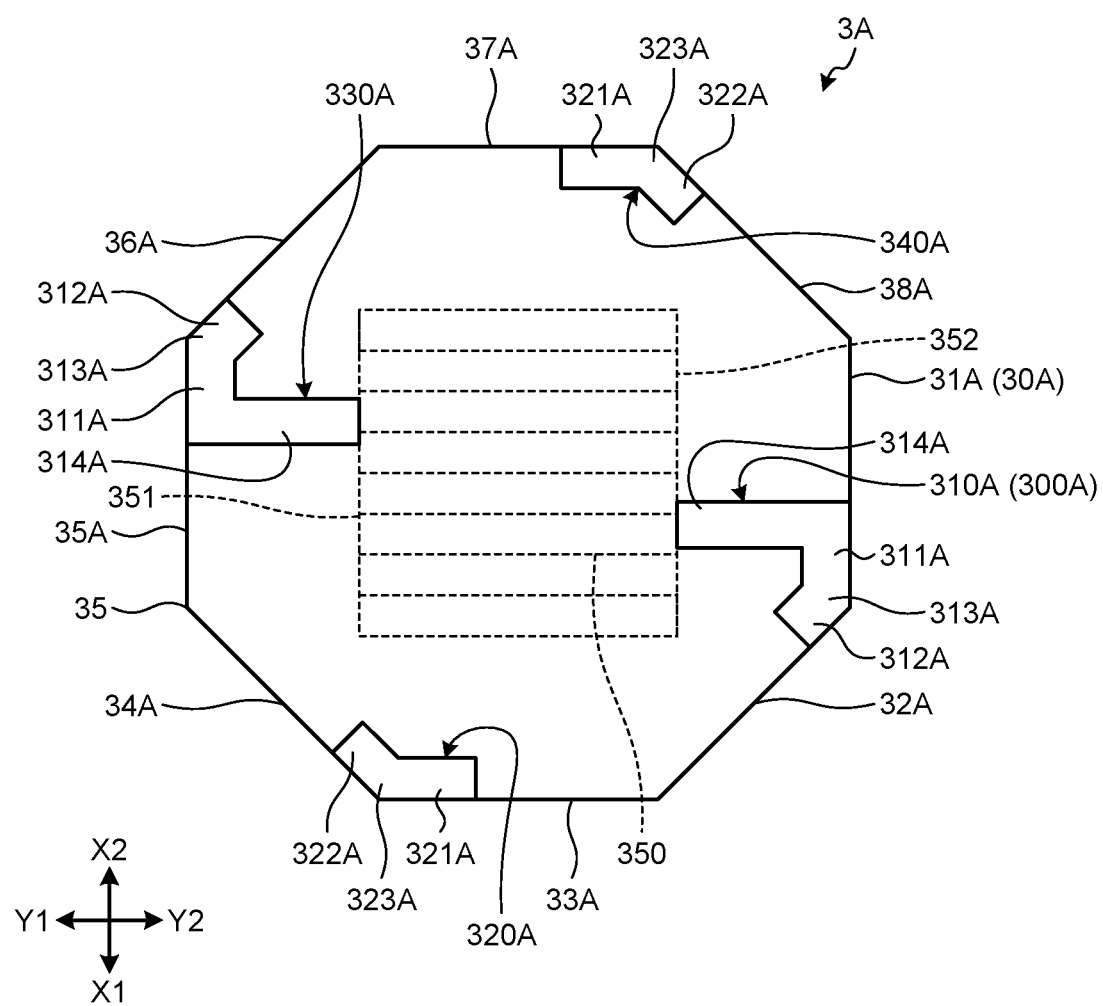
FIG. 15 is a plan view schematically illustrating a second substrate in the light adjustment device according to the second embodiment.

In the following description of a second embodiment, any same structure as in the first embodiment is denoted by the same reference sign and description thereof is omitted. FIG. 14 is a plan view schematically illustrating a first substrate and a sealing material in a light adjustment device according to the second embodiment. FIG. 15 is a plan view schematically illustrating a second substrate in the light adjustment device according to the second embodiment. Although the first and second substrates have square shapes in the configuration described above in the first embodiment, the first and second substrates have regular octagonal shapes in a configuration described in the second embodiment.

As illustrated in FIG. 14, a first substrate 2A has a regular octagonal shape in a plan view in the Z direction. The first substrate 2A has eight sides 20A. Specifically, the sides 20A include a side 21A, a side 22A, a side 23A, a side 24A, a side 25A, a side 26A, a side 27A, and a side 28A. First terminals 210A, 220A, 230A, and 240A are provided on the first substrate 2A.

The first terminal 210A includes a first site 211A, a second site 212A, and a first corner 213A. The first site 211A extends along the side (first side) 21A. The second site 212A extends along the side (second side) 22A. The first site 211A and the second site 212A couple to each other through the first corner 213A at the intersection part 25.

The first terminal 220A includes a first site 221A, a second site 222A, a first corner 223A, and a protrusion 224A. The first site 221A extends along the side (first side) 23A. The second site 222A extends along the side (second side) 24A. The first site 221A and the second site 222A couple to each other through the first corner 223A at the intersection part 25.

The first terminal 230A has the same shape as the first terminal 210A. The first terminal 240A has the same shape as the first terminal 220A. The first terminal 220A and the first terminal 240A are coupled to the liquid crystal drive electrodes 250.

The sealing material 600 has a substantially square annular shape in a plan view. Accordingly, the sealing material 600 has two sides 601 and 602 extending in the X direction and separated from each other in the Y direction, and two sides 603 and 604 extending in the Y direction and separated from each other in the X direction. Specifically, the side 601 is positioned on the Y2 side, and the side 602 is positioned on the Y1 side. The side 603 is positioned on the X1 side, and the side 604 is positioned on the X2 side. In the present embodiment as well, the sealing material 600 is disposed on the inner side of the intersection part 25. Accordingly, the first corner 213A of the first terminal 210A, the first corner 223A of the first terminal 220A, the first corner 213A of the first terminal 230A, and the first corner 223A of the first terminal 240A are exposed from the sealing material 600.

As illustrated in FIG. 15, a second substrate 3A has a regular octagonal shape in a plan view in the Z direction. The second substrate 3A has eight sides 30A. Specifically, the sides 30A include a side 31A, a side 32A, a side 33A, a side 34A, a side 35A, a side 36A, a side 37A, and a side 38A. Second terminals 310A, 320A, 330A, and 340A are provided on the second substrate 3A.

The second terminal 310A includes a third site 311A, a fourth site 312A, a second corner 313A, and a protrusion 314A. The third site 311A extends along the side (first side) 31A. The fourth site 312A extends along the side (second side) 32A. The third site 311A and the fourth site 312A couple to each other through the second corner 313A at the intersection part 35.

The second terminal 320A includes a third site 321A, a fourth site 322A, and a second corner 323A. The third site 321A extends along the side (first side) 33A. The fourth site 322A extends along the side (second side) 34A. The third site 321A and the fourth site 322A couple to each other through the second corner 323A at the intersection part 35. The second corner 313A of the second terminal 310A, the second corner 323A of the second terminal 320A, the second corner 313A of the second terminal 330A, and the second corner 323A of the second terminal 340A are exposed from the sealing material 600.

The second terminal 330A has the same shape as the second terminal 310A. The second terminal 340A has the same shape as the second terminal 320A. The second terminal 310A and the second terminal 330A are coupled to the liquid crystal drive electrodes 350.

As described above in the second embodiment, the shapes of the first substrate 2A and the second substrate 3A are octagonal, but the present invention is also applicable to a case in which the shapes are polygonal other than rectangular as in the first embodiment.

At least part of each of the first corner 213A or 223A of a first terminal 200A and the second corner 313A or 323A of a second terminal 300A is exposed from the sealing material 600. Thus, cutting powder remaining on the surfaces of the exposed terminals is washed away by cleaning liquid. In particular, as clearly understood from comparison between FIGS. 14 and 8, the area of each terminal exposed from the sealing material 600 is larger for the substrates of the second embodiment than the substrates of the first embodiment. Thus, according to the second embodiment, a larger amount of cutting powder remaining on the surface of each terminal is washed away by cleaning liquid.

Third Embodiment

Figure 16:
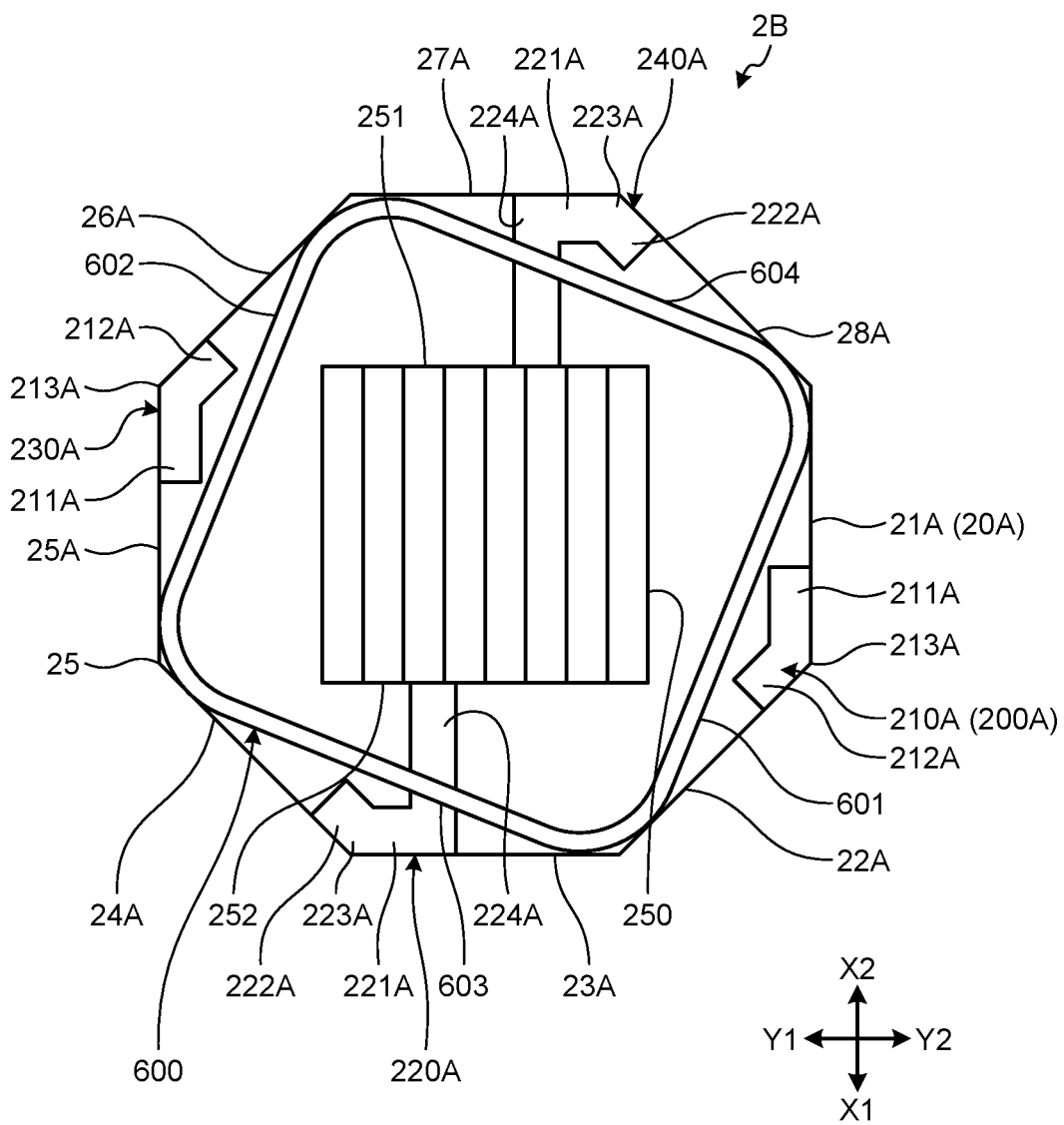
FIG. 16 is a plan view schematically illustrating a first substrate and a sealing material in a light adjustment device according to a third embodiment.
Figure 17:
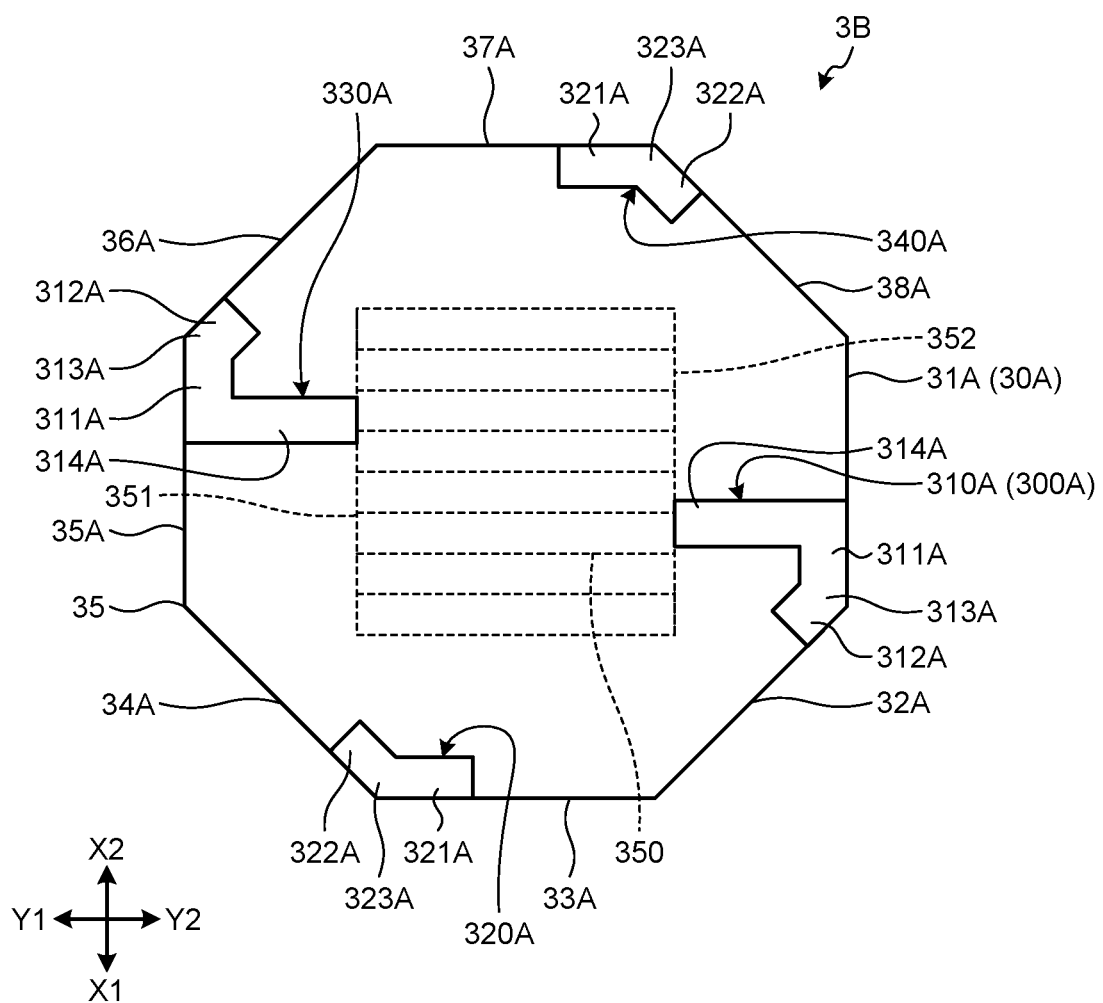
FIG. 17 is a plan view schematically illustrating a second substrate in the light adjustment device according to the third embodiment.

In the following description of a third embodiment, any same structure as in the first and second embodiments is denoted by the same reference sign and description thereof is omitted. FIG. 16 is a plan view schematically illustrating a first substrate and a sealing material in a light adjustment device according to the third embodiment. FIG. 17 is a plan view schematically illustrating a second substrate in the light adjustment device according to the third embodiment. In the third embodiment, the position of the sealing material 600 relative to the first substrate is different from that in the second embodiment. Brief description is provided below.

As illustrated in FIG. 16, the sealing material 600 has a substantially square annular shape in a plan view. The sealing material 600 has four sides 601, 602, 603, and 604. The sealing material 600 in FIG. 16 is provided at a position to which the sealing material 600 in FIG. 14 is rotated by approximately 22.5° in the clockwise direction (rightward direction) about the central part of a first substrate 2B. Thus, in FIG. 16, the side 604 of the sealing material 600 intersects the side 27A at an angle of approximately 22.5°. In the present embodiment as well, the sealing material 600 is disposed on the inner side of the intersection part 25. Accordingly, the first corner 213A of the first terminal 210A, the first corner 223A of the first terminal 220A, the first corner 213A of the first terminal 230A, and the first corner 223A of the first terminal 240A are exposed from the sealing material 600.

FIG. 17 includes a second substrate 3B having the same structure as in FIG. 15. The second corner 313A of the second terminal 310A, the second corner 323A of the second terminal 320A, the second corner 313A of the second terminal 330A, and the second corner 323A of the second terminal 340A are exposed from the sealing material 600.

As described above in the third embodiment as well, at least part of each of the first corner 213A or 223A of the first terminal 200A and the second corner 313A or 323A of the second terminal 300A is exposed from the sealing material 600. Thus, a larger amount of cutting powder remaining on the surface of each terminal is washed away by cleaning liquid.

What is claimed is:

1. A light adjustment device comprising:
a panel unit formed in a shape of a rectangular column by stacking a plurality of light adjustment panels in a first direction via translucent bonding agents, each of the light adjustment panels having a polygonal shape and including a first substrate and a second substrate, the first substrate including a first terminal, the second substrate overlapping the first substrate and including a second terminal; and
a conductive member provided at a corner of the rectangular column in a side part of the panel unit and continuously extending in the first direction, wherein
each of the first substrate and the second substrate includes a first side, a second side adjacent to the first side, and an intersection part at which the first side intersects the second side,
the first terminal includes a first site extending along the first side of the first substrate, a second site extending along the second side of the first substrate, and a first corner through which the first site couples to the second site at the intersection part of the first substrate, the first corner corresponding to the corner of the panel unit,
the second terminal includes a third site extending along the first side of the second substrate, a fourth site extending along the second side of the second substrate, and a second corner through which the third site couples to the fourth site at the intersection part of the second substrate, the second corner corresponding to the corner of the panel unit,
the conductive member electrically couples the first corner of the first terminal and the second corner of the second terminal in each of the light adjustment panels,
the panel unit is formed by stacking the light adjustment panels each including:
a liquid crystal layer disposed between the first substrate and the second substrate; and
a sealing material that surrounds the liquid crystal layer and that seals the liquid crystal layer, the sealing material being disposed on an inner side of the intersection parts, and at least part of each of the first corner of the first terminal and the second corner of the second terminal is exposed from the sealing material.

2. The light adjustment device according to claim 1, wherein
the sealing material includes a first peripheral part extending along the first sides of the first substrate and the second substrate, a second peripheral part extending along the second sides of the first substrate and the second substrate, and a coupling part that couples an end of the first peripheral part and an end of the second peripheral part,
the coupling part is disposed on the inner side of the intersection parts, and
at least part of each of the first corner of the first terminal and the second corner of the second terminal is exposed from the sealing material.

3. The light adjustment device according to claim 2, wherein a first end face that is an end face of the first substrate, a second end face that is an end face of the second substrate, and a third end face that is an end face of the sealing material are flush with one another.

4. The light adjustment device according to claim 1, further comprising an external coupling wire that is a conductive wire electrically coupled to a light source, wherein
one end of the conductive wire is electrically coupled to a site closest to one side or another side of the conductive member in the first direction, and
another end of the conductive wire is electrically coupled to the light source.

5. The light adjustment device according to claim 1, further comprising an external coupling wire that is a conductive wire electrically coupled to a light source, wherein
one end of the conductive wire is electrically coupled through a conductor to a site closest to one side or another side of the conductive member in the first direction, and
another end of the conductive wire is electrically coupled to the light source.

* * * * *